United States Patent

[11] 3,532,087

| | | |
|---|---|---|
| [72] | Inventors | Anton J. Horn;<br>Christopher C. Kuni, St. Louis County, Missouri |
| [21] | Appl. No. | 627,034 |
| [22] | Filed | March 30, 1967 |
| [45] | Patented | Oct. 6, 1970 |
| [73] | Assignee | By mesne assignments to<br>Hoffmann-LaRoche Inc., Nutley, N.J.<br>a corporation of New Jersey |

[54] RESPIRATION RATE METER
2 Claims, 1 Drawing Fig.

| | | |
|---|---|---|
| [52] | U.S. Cl. | 128/2.1 |
| [51] | Int. Cl. | A61b 5/08 |
| [50] | Field of Search | 128/2.05, 2.06, 2.08, 2.1; 324/78(E—1), 85, 120; 321/6, 65; 328/38, 127, 140 |

[56]                       References Cited
                    UNITED STATES PATENTS

| 2,540,505 | 2/1951 | Bliss | 324/78E |
|---|---|---|---|
| 3,156,115 | 11/1964 | Adelmann | 324/78E |
| 3,347,223 | 10/1967 | Pacella | 128/2.1 |

Primary Examiner—William E. Kamm
Attorneys—Jon S. Saxe, Bernart S. Leon, Jacob Frank and Samuel L. Welt

ABSTRACT: Electrodes apply an electric signal to the body of a person, the transthoracic impedance of that person varies as that person breathes, the variations in transthoracic impedance of that person coact with that electric signal to provide a voltage which varies at a frequency corresponding to the respiration rate of that person, the frequency of that voltage is multiplied, a signal having the multiplied frequency is applied to a rate circuit which has a short time constant, the voltage lever developed across that rate circuit is applied to a sensitive respiration rate meter, and that meter provides a readily readable indication of that person's respiration rate even when that respiration rate changes abruptly.

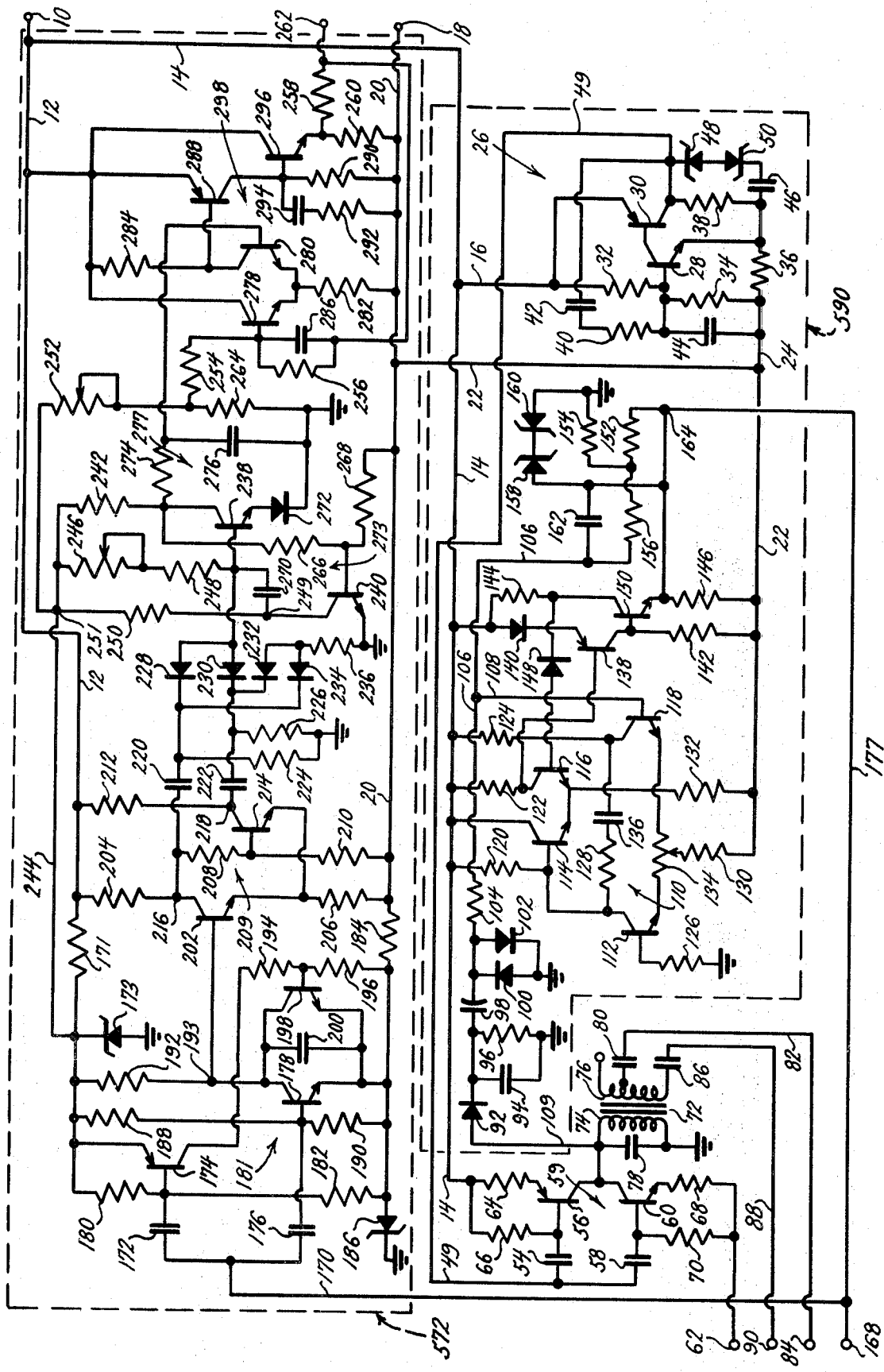

RESPIRATION RATE METER

This invention relates to improvements in control systems. More particularly, this invention relates to improvements in control systems for respiration rate meters.

It is, therefore, an object of the present invention to provide an improved control system for a respiration rate meter.

The normal respiration rate of human beings is relatively slow; and, under certain conditions of injury or illness, can become materially slower. That respiration rate can, under such conditions, become so slow that the needle of a respiration rate meter will experience wide swings; and, where the needle of such a meter experiences such swings, it is extremely difficult, if not impossible, to obtain an accurate determination of the respiration rate. It is possible to reduce the swings of the needle of a respiration rate meter by connecting a large capacitor in parallel with that meter; but such a capacitor would keep that meter from indicating abrupt changes in a person's respiration rate—and abrupt changes in a person's respiration rate can be of crucial significance. It would be desirable to provide a control system for a respiration rate meter which would enable that meter to provide a readily readable indication of a person's respiration rate even if that respiration rate changed abruptly. The present invention provides such a control system; and it does so by developing an electric voltage which has a frequency corresponding to the respiration rate of a person, by multiplying the frequency of that voltage to provide a signal which has a multiplied-frequency, by applying that multiplied-frequency signal to a rate circuit which has a short time constant, and by using the voltage level developed across that rate circuit to drive a sensitive respiration rate meter. The multiplied-frequency signal will supply sufficient pulses per minute to the rate circuit to enable that rate circuit to develop a relatively steady voltage level even when the respiration rate of a person is abnormally low; and such a voltage level will enable the respiration rate meter to avoid wide swings of the needle thereof even when that person's respiration rate is abnormally low. However, that rate circuit will, because of its short time constant, quickly develop a different voltage level when a change in the person's respiration rate causes a change in the multiplied-frequency signal applied to that rate circuit. It is, therefore, an object of the present invention to provide a control system for a respiration rate meter that develops an electric voltage which has a frequency corresponding to the respiration rate of a person, that multiplies the frequency of that voltage to provide a signal which has a multiplied-frequency, that applies that multiplied-frequency signal to a rate circuit which has a short time constant, and that uses the voltage level developed across that rate circuit to drive a sensitive respiration rate meter.

An electric voltage which has a frequency corresponding to the respiration rate of a person can be developed by applying an electric signal to the body of that person, and by using the interaction between that electric signal and the breathing-induced variations in the transthoracic impedance of that person to develop a voltage which varies at a frequency corresponding to that of that person's respiration rate. However, the transthoracic impedances of different persons can differ widely; and yet it would be undesirable to have to adjust the control system for a respiration rate meter to "match" the differing transthoracic impedances of different persons. consequently, it would be desirable to provide a control system for a respiration rate meter which did not have to be adjusted to "match" the differing transthoracic impedances of different persons. The present invention provides such a control system; and it does so by providing A.C. coupling of the signal, which corresponds to the respiration rate of a person, to the frequency-multiplying section of that control system. It is, therefore, an object of the present invention to provide a control system for a respiration rate meter wherein the signal, which corresponds to the respiration rate of a person, is A–C coupled to the frequency-multiplying section of that control system.

Other and further objects and advantages of the present invention should become apparent from an examination of the drawing and accompanying description.

In the drawing and accompanying description a preferred embodiment of the present invention is shown and described, but it is to be understood that the drawing and accompanying description are for the purpose of illustration only and do not limit the invention and that the invention will be defined by the appended claims.

The drawing is a schematic diagram of one preferred embodiment of control system that is made in accordance with the principles and teachings of the present invention.

COMPONENTS OF CONTROL SYSTEM

Referring to the drawing in detail, the numeral 10 denotes a terminal which can be connected to a source of positive D.C. voltage; and, in the said one preferred embodiment of control system provided by the present invention, that source supplies 12 volts. A conductor 12 and a conductor 14 are connected to that terminal; and a conductor 16 extends between the conductor 14 and the emitter of a PNP transistor 30. A resistor 32 is connected between the conductor 16 and the base of an NPN transistor 28. A terminal 18 is connectable to a source of negative D.C. voltage; and, in the said one preferred embodiment of control system, that source supplies 12 volts. A conductor 20 is connected to that terminal; and a conductor 22 is connected to the conductor 20. A conductor 24 and a resistor 36 connect the emitter of the transistor 28 to the conductor 22 and thus to the source of negative D.C. voltage.

The transistors 28 and 30 are component parts of an R.C. phase-shift oscillator 26; and, in the said one preferred embodiment of control system, that oscillator is a self-generating oscillator which develops a frequency of 50 kilocycles per second. In addition to the transistors 28 and 30 and the resistors 32 and 36, the oscillator 26 includes resistors 34, 38 and 40, capacitors 42, 44 and 46, and Zener diodes 48 and 50. These Zener diodes maintain a constant peak output level for the 50 kilocycle waveform developed by the oscillator 26. That waveform appears at the collector of the transistor 30; and a conductor 49 applies that waveform to the left-hand terminals of capacitors 54 and 58. The right-hand terminal of the capacitor 54 is connected to the base of a PNP transistor 56, while the right-hand terminal of the capacitor 58 is connected to the base of an NPN transistor 60. The numeral 62 denotes a terminal that is connectable to the source of negative D.C. voltage which supplies 12 volts; and a resistor 68 connects the emitter of the transistor 60 to that terminal while a resistor 70 connects the base of that transistor to that terminal. A resistor 64 connects the emitter of the transistor 56 to the conductor 14, and thus to the source of positive D.C. voltage, while a resistor 66 connects the base of that transistor to that conductor.

The collectors of the transistors 56 and 60 are connected to each other, and are connected to ground by parallel-connected capacitor 78 and the primary winding 74 of a transformer 72. That transformer has a center-tapped secondary winding 76; and a capacitor 80 and a conductor 82 connect the center tap of that secondary winding to a terminal 84, while a capacitor 86 and a conductor 88 connect the lower terminal of that secondary winding to a terminal 90. The terminals 84 and 90 can be connected to electrodes affixed to the body of a person whose respiration rate is to be checked. Preferably, those electrodes are disposed at opposite sides of the thoracic cage of that person.

The transistors 56 and 60 and the resistors associated therewith constitute a push-pull constant current generator 59; and that constant current generator will respond to the 50 kilocycle waveform from the oscillator 26 to apply a constant current 50 kilocycle waveform to the primary winding 74 of the transformer 72. The capacitor 78 and that primary winding constitute a tuned circuit which is resonant at the 50 kilocycle frequency of the oscillator 26.

A conductor 109, a diode 92, a capacitor 98, a resistor 104, and conductors 106 and 108 connect the upper terminals of primary winding 74 and capacitor 78 to the base of an NPN transistor 118. The diode 92 acts as a half-wave rectifier; and a capacitor 94 an a resistor 96, which are connected in parallel with each other and between the cathode of diode 92 and ground, act as a partial bypass filter for the 50 kilocycle waveform from the oscillator 26. That capacitor 94 will, however, constitute a high impedance to any relatively low frequency voltage variations; and such voltage variations will appear across the resistor 96. As a result, the diode 92, the capacitor 94, and the resistor 96 constitute a detector for the voltage which is developed as the transthoracic impedance of the person varies and which thus has a frequency corresponding to the respiration rate of that person.

Two diodes 100 and 102 are connected in back-to-back configuration between the right-hand terminal of the capacitor 98 and ground; and those diodes will limit the voltage that can be developed across the resistor 96, thereby facilitating the recovery of the control system from transients associated with the electrodes affixed to the body of the person.

The transistor 118, NPN transistors 112, 114, 116 and 150, and PNP transistor 138 constitute component parts of an operational amplifier 110; and that operational amplifier also includes resistors 120, 122, 124, 126, 128, 130, 132, 142, 144 and 146, a potentiometer 134, a capacitor 136, and diodes 140 and 148. The resistor 126 is connected to ground and thus maintains the base of the transistor 112 at essentially ground level. The resistor 120 connects the collector of the transistor 112 and the base of the transistor 114 to the conductor 14, and thus to the source of positive D.C. voltage. The collector of the transistor 114 is directly connected to the conductor 14; and resistors 122 and 124, respectively, connect the collectors of the transistors 116 and 118 to that conductor. The emitters of transistors 114 and 116 are connected together and are connected to the conductor 22, and hence to the source of negative D.C. voltage by the resistor 132. Potentiometer 134 and resistor 130 connect the emitters of transistors 112 and 118 to the conductor 22. The output of the operational amplifier 110 appears at the emitter of the transistor 150; and the potentiometer 134 acts as a balancing resistor to control the value of the D.C. output of that operational amplifier.

A diode 140 connects the conductor 14 to the emitter of the transistor 138, and a resistor 142 connects the collector of that transistor to the conductor 22. A resistor 144 connects the collector of an NPN transistor 150 to the conductor 14, and a resistor 146 connects the emitter of that transistor to the conductor 22. The base of the transistor 150 is connected to the upper terminal of the resistor 142. A diode 148 is connected between the base of the transistor 116 and the lower terminal of the resistor 144. The transistor 138 is connected in a constant current configuration; and thus has a high output impedance and provides extra gain. The transistor 150 is connected as an emitter follower; and the upper terminal of resistor 146 is connected to a terminal 168 by a junction 164 and a conductor 177, and is connected to the left-hand terminals of capacitors 172 and 176 by that junction and that conductor plus a conductor 170. The terminal 168 and ground can be connected to a recorder, an oscilloscope, a volume indicator, or other device which can respond to a signal which is representative of the respiration rate of a person.

Zener diodes 158 and 160 are connected in series between the junction 164 and ground, and the cathodes of those Zener diodes are connected together. Those Zener diodes will limit the maximum voltage that can be applied to the terminal 168 and to the capacitors 172 and 176. Resistors 152 and 154 are connected in series between the junction 164 and ground; and resistor 156 and the conductors 106 and 108 are connected between the left-hand terminal of resistor 152 and the base of transistor 118. A capacitor 162 and the conductors 106 and 108 connect the upper terminal of resistor 146 to the base of transistor 118. Resistors 152 and 156 and conductors 106 and 108 will supply negative feedback from the upper terminal of resistor 146 to the base of transistor 118; and capacitor 162 and those conductors also will supply negative feedback from the upper terminal of resistor 146 to the base of transistor 118. That negative feedback will tend to eliminate any residuum of the 50 kilocycle waveform from the oscillator 26, will fix the gain of the operational amplifier 110, and will also help eliminate any ripple, noise and transients.

The right-hand terminal of the capacitor 172 is connected to the base of a PNP transistor 174; and the right-hand terminal of the capacitor 176 is connected to the base of an NPN transistor 178. The transistor 174 will respond to negative-going portions of any signals applied to the capacitors 172 and 176, and the transistor 178 will respond to positive-going portions of those signals. A Zener diode 186 and a resistor 184 connect the conductor 20 to ground; and that resistor and Zener diode will coact to develop a substantially fixed negative voltage at the emitter of the transistor 178 and at the lower terminals of resistors 182 and 190. A resistor 171 and a Zener diode 173 connect the conductor 12 to ground; and that resistor and Zener diode will coact to develop a substantially-fixed positive voltage at the emitter of the transistor 174 and at the upper terminals of resistors 180, 188 and 192. The resistors 180 and 182 constitute a voltage divider which fixes the D.C. voltage at the base of the transistor 174; and the resistors 188 and 190 constitute a voltage divider which fixes the D.C. voltage at the base of the transistor 178. The lower terminal of the resistor 192 is connected to the collector of the transistor 178 by a junction 193. An NPN transistor 198 has the collector-emitter circuit thereof connected in parallel with the collector-emitter circuit of the transistor 178; and a capacitor 200 is connected in parallel with those collector-emitter circuits. Resistors 194 and 196 are connected between the collector of the transistor 174 and the left-hand terminal of the resistor 184. The transistors 174, 178 and 198, the capacitor 200, and the resistors associated with those transistors constitute a frequency-doubling amplifier 181. The output of that frequency-doubling amplifier will appear at the junction 193; and that output will be a waveform which has twice the frequency and a greater amplitude than the waveform applied to the left-hand terminals of the capacitors 172 and 176 by the conductor 170.

That amplified and frequency-doubled waveform is applied to the base of an NPN transistor 202; and the collector of that transistor is connected to the conductor 12 by a junction 216 and a resistor 204, while the emitter of that transistor is connected to the conductor 20 by a resistor 206. An NPN transistor 214 has the collector thereof connected to conductor 12 by a junction 218 and a resistor 212, and has the emitter thereof connected to the upper terminal of resistor 206. Resistors 208 and 210 are connected in series with the resistor 204 between the conductors 12 and 20; and the base of transistor 214 is connected to the junction between the resistors 208 and 210 The transistors 202 and 214 and the resistors associated therewith constitute a Schmitt trigger 209 which acts as a phase splitter.

A capacitor 220 and a diode 228 are connected between the junction 216 and the base of an NPN transistor 238; and that capacitor, a diode 234, and a resistor 236 are connected between that junction and ground. A capacitor 222 and a diode 230 are connected between the junction 218 and the base of the transistor 238; and that capacitor, a diode 232 and the resistor 236 are connected between that junction and ground. A resistor 224 is connected between the right-hand terminal of the capacitor 220 and ground, and a resistor 226 is connected between the right-hand terminal of the capacitor 222 and ground. The diodes 228, 230, 232 and 234 coact with the Schmitt trigger 209 to apply to the base of transistor 238 a waveform which has twice the number of positive-going portions that the waveform applied to the base of transistor 202 has; and hence the waveform applied to the base of transistor 238 has four times as many positive-going portions as the waveform applied to the left-hand terminals of capacitors 172 and 176 by the conductor 170.

An NPN transistor 240 has the emitter thereof grounded; and has the collector thereof connected to the terminal 10, and thus to the source of positive voltage, by a junction 249, a resistor 250, a junction 251, a conductor 244, the resistor 171, and the conductor 12. An adjustable resistor 252, a resistor 254, a resistor 256, a resistor 258, a resistor 260, and the conductor 20 are connected between the junction 251 and the terminal 18. The junction between the resistors 256 and 258 is connected to a terminal 262 that is connectable to a respiration rate meter. In the said one preferred embodiment of control system, that meter is a commercially available, sensitive, contactless meter relay, which has an adjustable upper alarm and an adjustable lower alarm.

The conductor 244, junction 251, and resistors 242, 266 and 268 are connected between the left-hand terminal of resistor 171 and the conductor 20, and thus are connected between the substantially fixed positive D.C. voltage and the negative voltage. The junction between resistors 242 and 274 is connected to the collector of transistor 238; and the junction between the resistors 266 and 268 is connected to the base of the transistor 240. An adjustable resistor 246, a resistor 248, and junction 251 connect the conductor 244 to the base of the transistor 238; and the emitter of that transistor is connected to ground by a diode 272. A capacitor 270 is connected between the collector of transistor 240 and the base of transistor 238. A resistor 264 is connected between ground and the junction between adjustable resistor 252 and resistor 254.

The transistors 238 and 240 and the resistors 242, 248, 250, 266 and 268, the adjustable resistor 246, the capacitor 270, and the diode 272 constitute a monostable multivibrator 273 which will be triggered by the waveform at the anodes of the diodes 228 and 230. That monostable multivibrator is designed to shift to its triggered state and back to its normal state in a time which is shorter than the shortest possible interval between pulses of the quadrupled frequency at the anodes of diodes 228 and 230. The adjustable resistor 246 acts as a "maximum adjust" for the respiration rate meter connected to the terminal 262. The resistor 274 and a capacitor 276 connect the collector of the transistor 238 to ground; and that capacitor and that resistor constitute a rate circuit 277. That rate circuit will respond to pulses applied thereto to develop a D.C. voltage level. The multivibrator 273 will respond to the frequency-multiplied and amplified waveform from the diodes 228 and 230 to develop a D.C. voltage level across the rate circuit 277 which will represent the respiration rate of the person to which the electrodes, connected to the terminals 84 and 90, are affixed.

That voltage level will be applied to the base of an NPN transistor 280; and the collector of that transistor is connected to the conductor 12 by a resistor 284, while the emitter of that transistor is connected to the conductor 20 by a resistor 282. An NPN transistor 278 has the collector thereof connected directly to the conductor 12, and has the emitter thereof connected to the conductor 20 by the resistor 282. The base of the transistor 278 is connected to the junction between resistors 254 and 256; and a capacitor 286 is connected in parallel with the resistor 256. A PNP transistor 288 has the emitter thereof connected directly to the conductor 12, and has the collector thereof connected to the conductor 20 by a resistor 290. A resistor 292 and a capacitor 294 are connected in series with each other and in parallel with the resistor 290. An NPN transistor 296 has the collector thereof directly connected to the conductor 12, and has the emitter thereof connected to the conductor 20 by the resistor 260. That emitter also is connected to the terminal 262 by the resistor 258. The base of that transistor is connected to the upper terminals of resistor 290 and capacitor 294. The transistors 278, 280, 288 and 296, the resistors 254, 256, 258, 260, 282, 284, 290 and 292, and the capacitors 286 and 294 constitute an operational amplifier 298; and the output of that operational amplifier is connected to the terminal 262 by the resistor 258. The resistors 254 and 256 and the capacitor 286 constitute a feedback network to fix the gain of that operational amplifier. The adjustable resistor 252 is a calibration adjustment for the respiration rate meter which is connected to the terminal 262 and to ground.

The numeral 572 denotes a block which contains the frequency-multiplying portion of the control system and which also contains a monostable multivibrator, a rate circuit, an operational amplifier, and other portions of that control system. The numeral 590 denotes a block which contains a phase-shift oscillator, a detector, an operational amplifier, and other portions of that control system.

OPERATION OF CONTROL SYSTEM

In using the control system provided by the present invention, the operator will connect the terminals 84 and 90 to electrodes which are affixed to the body of a person; and those electrodes preferably will be disposed at opposite sides of the thoracic cavity of that person. The terminal 10 will be connected to the source of positive D.C. voltage, the terminals 18 and 62 will be connected to the source of negative D.C. voltage, and the terminal 262 will be connected to the ungrounded terminal of the respiration rate meter. In addition, the terminal 168 can be connected to a recorder, an oscilloscope, a volume indicator, or other device which can respond to a signal which is representative of the respiration rate of a person. Thereupon, the oscillator 26 will develop a 50 kilocycle waveform; and the conductor 49 and the capacitors 54 and 58 will apply that waveform to the bases of the transistors 56 and 60. Those transistors will act as a constant current generator, and they will apply that 50 kilocycle waveform to the tuned circuit which includes capacitor 78 and the primary winding 74 of transformer 72. The secondary winding 76 of that transformer will coact with the capacitors 80 and 86, the conductors 82 and 88, the terminals 90 and 84, and the electrodes affixed to the body of the person to couple the 50 kilocycle waveform to that person's body. The transthoracic impedance of that person's body will change as that person breathes—that impedance increasing as that person inhales, and decreasing as that person exhales. That change in transthoracic impedance will appear as a change in the "loading" on the secondary winding 76 of the transformer 72; and that transformer will reflect that change in "loading" back through the primary winding 74, the conductor 109, the diode 92, the capacitor 98, the resistor 104, and the conductors 106 and 108 to the base of the transistor 118.

Because the constant current generator 59, of which the transistors 56 and 60 are component parts, will provide a constant current output, the changes in "loading" which are reflected back through the primary winding 74 of the transformer 72 will appear as changes in voltage; and those changes in voltage will be developed across the voltage divider constituted by the diode 92 and the resistor 96. The conductive resistance of the diode 92 will be very small relative to the resistance of resistor 96; and hence substantially all of the changes in voltage across the primary winding 74 will appear across the resistor 96. The capacitor 94 will bypass most of the 50 kilocycle waveform to ground; and the diodes 100 and 102 will limit the voltage that can be developed across the resistor 96. This means that a substantially ripple-free voltage signal, which corresponds to the respiration rate of the person, will be developed across the resistor 96 and will be coupled to the base of the transistor 118.

The operational amplifier 110 of which the transistor 118 is a component part, will amplify the voltage signal which corresponds to the respiration rate of the person; and that signal will be applied to the base of transistor 138. That transistor is connected as an emitter follower, and it will apply that signal to the base of transistor 150; and the latter transistor will supply a varying D.C. voltage signal to the junction 164 which will correspond to the respiration rate of the person. That varying D.C. voltage signal will have a very low frequency—usually less than thirty cycles per minute. If that signal were to be applied directly to the ungrounded terminal of a sensitive respiration rate meter, the needle of that meter would experience wide swings during each positive-going portion of that signal. Such wide swings would be very objectionable; because they would make it difficult to determine the person's respiration rate with any degree of accuracy, and because they would make it impractical to set the upper and lower alarm limits of that meter close to the indicated respiration rate of that person.

The control system provided by the present invention does not apply that signal directly to the ungrounded terminal of a sensitive respiration rate meter; and, instead, applies that signal to the terminal 168 by the conductor 177, and to the bases of the transistors 174 and 178 by the conductors 166 and 170 and the capacitors 172 and 176. The frequency-doubling amplifier 181 of which those transistors are component parts will respond to that signal to double its frequency and to increase its amplitude. The Schmitt trigger 209, which acts as a phase splitter, and the diodes 228, 230, 232 and 234 will apply to the base of the transistor 238 a signal which has twice as many positive-going portions as does the signal at the output of the frequency-doubling amplifier 181; and hence that push-pull amplifier and those diodes will apply to the base of that transistor a signal which has four times as many positive-going portions as the signal at the junction 164. That quadrupled-frequency signal will trigger the monostable multivibrator 273; and that monostable multivibrator will provide a series of constant amplitude pulses at the collector of the transistor 238 which are greater in amplitude than, and which have a frequency that is four times the frequency of, the signal at the junction 164. The resistor 274 and the capacitor 276 of the rate circuit 277 will respond to those pulses to develop a D.C. level across the capacitor 276, and hence at the base of the transistor 280, which is proportional to the respiration rate of the person. The operational amplifier 298 will respond to that D.C. level to develop a D.C. voltage at the terminal 262, and thus at the ungrounded terminal of the sensitive respiration rate meter connected to that terminal; and that voltage will vary as the respiration rate of the person varies. However, that voltage will enable the needle of the sensitive respiration rate meter to remain substantially steady, and not experience wide swings, as long as the person's respiration rate is regular. Even where a person's respiration rate is very low, the voltage at the terminal 262, and thus at the ungrounded terminal of the sensitive respiration rate meter, will be sufficiently steady to keep the needle of that sensitive respiration rate meter from experiencing wide swings. As a result, the operator can readily and accurately determine the respiration rate of the person by a visual examination of the position of the needle of the meter. Also, the upper and lower alarm limits of the sensitive respiration rate meter can be set close to the patient's indicated respiration rate. This is very desirable; because it enables the respiration rate meter to actuate an alarm circuit if the person's respiration rate changes by even a small percentage.

CONCLUSION

Although the control system provided by the present invention enables the needle of the sensitive respiration rate meter to remain substantially steady, and not experience wide swings, as long as the person's respiration rate is regular, that control system enables that needle to move quickly to a new position whenever the person's respiration rate changes. Because the frequency of the signal at the output of the monostable multivibrator 273 is four times as great as the frequency of the signal at the junction 164, the time constant of the rate circuit 277 can be much smaller than it would have to be if the signal at the junction 164 were applied to it. Specifically, the capacitor 276 can have as little as one-quarter of the capacitance which it would have to have if the signal at the junction 164 was applied to it. Such a small capacitor is very desirable because the time constant of that capacitor will be proportionately shorter than the time constant of a capacitor having four times its capacitance, and because the needle of the respiration rate meter will respond to changes in the person's respiration rate four times as rapidly as it would with a capacitor having four times the capacitance of capacitor 276. As a result, the respiration rate meter can closely indicate a person's respiration rate and can have the upper and lower alarm limits set close to that person's indicated respiration rate, and yet can quickly indicate changes in that person's respiration rate.

The frequency-doubling amplifier 181, the Schmitt trigger 209, and the diodes 228, 230, 232 and 234 coact to constitute a frequency quadrupler and amplifier. That frequency quadrupler and amplifier is very desirable; because it does not utilize a transformer or other electromagnetic element —and thus can respond to abnormally low respiration rates, and also can have a wide dynamic range. In the said one preferred embodiment of control system, that frequency quadrupler and amplifier can respond to respiration rates of just a few pulses per minute, and has a dynamic range greater than twenty-five to one. As a result, the control system provided by the present invention can not only cause a sensitive respiration rate meter to display in readily readable form the normal respiration rates of persons at rest, but can also cause that meter to display in readily readable form respiration rates ranging from a few breaths per minute to as many as 60 breaths per minute.

In the said one preferred embodiment of control system, the oscillator 26 develops a 50 kilocycle per second waveform.

Oscillators developing higher or lower frequency waveforms can be used, but oscillators developing waveforms having frequencies greater than 20 kilocycles per second are preferred.

The voltage signal at the junction 164 is A.C. coupled to the frequency-doubling amplifier 181 by the capacitors 172 and 176 and the resistors 180 and 190; and such coupling is very desirable. Specifically, that coupling obviates all need of adjusting the control system to match the transthoracic impedances of different persons. Moreover, that coupling obviates all need of adjusting the control system to match the changes in transthoracic impedance which occur in a given person as that person changes from a lying to a sitting position or vice versa, rolls over, or the like.

In the said one preferred embodiment of control system provided by the present invention, the rate circuit 277 has a time constant of twenty seconds. Such a time constant is very desirable because it enables that rate circuit to respond to the multiplied-frequency signals corresponding to just a few breaths per minute to prevent wide swings of the needle of the meter, and yet will permit that needle to fall from a two-thirds full scale reading to zero in 20 seconds. While a time constant of 20 seconds is very desirable for the rate circuit 277, that rate circuit could have a time constant of as long as a minute and still enable the control system to quickly and closely follow rapid changes in a person's respiration rate.

The capacitors 80 and 86 and the transformer 72 isolate the terminals 84 and 90 from ground; and the heart rate circuit avoids all need of grounding the body of the person whose respiration rate is to be monitored. This is desirable because it enables that respiration rate circuit to be used with other devices, systems and equipment without subjecting that person to the risk of electrical shocks due to ground loops through his body and those other devices, systems, and equipment.

Whereas the drawing and accompanying description have shown and described a preferred embodiment of the present invention, it should be apparent to those skilled in the art that various changes may be made in the form of the invention without affecting the scope thereof.

We claim:

1. A control system, for a respiration rate meter, which comprises first means to develop an electric signal that varies at a frequency corresponding to a respiration rate and a frequency multiplier and a second means which respond to said electric signal to develop a voltage that corresponds to the frequency of said signal, and thus to said respiration rate, and that is applied to said respiration rate meter, and terminals that are adapted to be connected to electrodes which can be affixed to a person, and an A.C. coupling means including a transformer between said terminals and said frequency multiplier, said first means including a high frequency signal source connected to said A.C. coupling to aid in developing said signals said frequency multiplier connected from said transducer and receiving said signal and multiplying the frequency thereof, wherein said high frequency signals coact with breathing-induced changes in the transthoracic impedance of said person to appear as a change in the "loading" of said transformer, whereby said transformer can reflect said change in "loading" to said frequency multiplier to apply the first said signal to said frequency multiplier, said A.C. coupling means obviating the need of adjustments of said control system due to differences between the transthoracic impedances of different persons or to changes in the transthoracic impedance of a person as such person assumes different positions.

2. In a control system for a respiration rate meter as claimed in claim 1 wherein said A.C. coupling includes a capacitor between one of said terminals and said frequency multiplier and also includes a second capacitor between the other of said terminals and said frequency multiplier.